Figure 1:
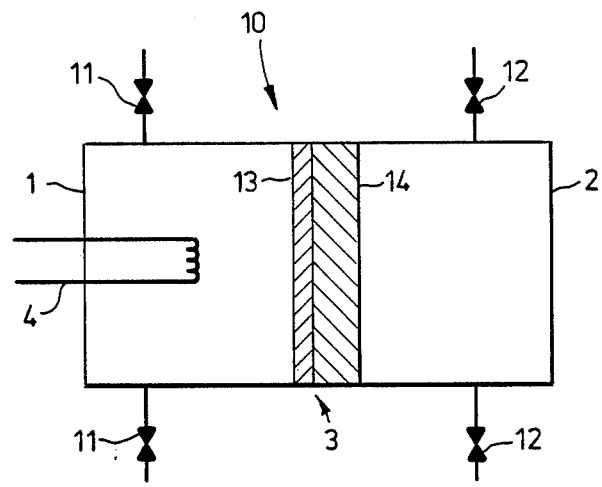

United States Patent [19]

Shmayda et al.

[11] Patent Number: 4,944,777
[45] Date of Patent: Jul. 31, 1990

[54] SEPARATING HYDROGEN FROM A MIXTURE OF SUBSTANCES

[76] Inventors: Walter T. Shmayda, 240 Melrose Avenue, King City, Ontario, Canada; Francois Waelbroeck, Mannheimer Str. 4, D-5170 Juelich, Fed. Rep. of Germany; Peter Wienhold, Rurallee 7, D-5172 Linnich, Fed. Rep. of Germany; Joerg Winter, Auestrasse 36, D-5162 Niederzier, Fed. Rep. of Germany

[21] Appl. No.: 776,623

[22] Filed: Sep. 16, 1985

[30] Foreign Application Priority Data

Sep. 18, 1984 [DE] Fed. Rep. of Germany ....... 3434150

[51] Int. Cl.⁵ .................. B01D 53/22; B01D 71/02
[52] U.S. Cl. ............................ 55/16; 55/158
[58] Field of Search ......................... 55/16, 158

[56] References Cited

U.S. PATENT DOCUMENTS

| | | | |
|---|---|---|---|
| 2,540,152 | 2/1951 | Weller | 55/16 |
| 2,671,336 | 3/1954 | Hulsberg | 55/158 X |
| 2,824,620 | 2/1958 | deRosset | 55/16 |
| 2,958,391 | 11/1960 | deRosset | 55/158 X |
| 3,022,187 | 2/1962 | Eyraud et al. | 55/16 X |
| 3,104,960 | 9/1963 | Chamberlin et al. | 55/158 |
| 3,214,245 | 10/1965 | Peters, Jr. | 55/158 X |
| 3,241,298 | 3/1966 | Pierce | 55/158 X |
| 3,344,582 | 10/1967 | Merrill et al. | 55/16 |
| 3,407,571 | 10/1968 | Sherwood | 55/158 |
| 4,494,965 | 1/1985 | Ali-Khan et al. | 55/16 |

FOREIGN PATENT DOCUMENTS

| | | | |
|---|---|---|---|
| 2854682 | 6/1980 | Fed. Rep. of Germany | 55/16 |
| 1292385 | 3/1962 | France | 55/158 |
| 177117 | 10/1984 | Japan | 55/16 |
| 97023 | 5/1985 | Japan | 55/158 |

*Primary Examiner*—Robert Spitzer
*Attorney, Agent, or Firm*—Ridout & Maybee

[57] ABSTRACT

In separating hydrogen from a mixture of gases by diffusion through a non-porous membrane which is selectively permeable to hydrogen, the hydrogen being at least partially dissociated prior to being contacted with the membrane, the membrane is made up of at least two layers of different materials. The layer on the upstream side of the membrane is less dissolving to hydrogen and has a lower release rate constant at 300° C. than the layer on the downstream side. The membrane may consist of an iron diaphragm with a thin coating of copper on the upstream side.

9 Claims, 1 Drawing Sheet

SEPARATING HYDROGEN FROM A MIXTURE OF SUBSTANCES

This invention relates to a method of separating hydrogen and hydrogen isotopes from mixtures, more particularly gas mixtures, by means of diffusion through a non-porous membrane which is selectively permeable to hydrogen. In such a method, in which the hydrogen is selectively diffused through the membrane from a first chamber or space into a second chamber or space, the hydrogen is at least partially dissociated prior to contacting the membrane. The invention also relates to an apparatus for implementing the method.

One such process is known from German Patent application 2854638, according to which the effectiveness of hydrogen separation by means of diffusion is considerably enhanced by the fact that the dissociation energy required is already imparted to the hydrogen before contacting the membrane, so that it can enter the membrane material unimpeded. At least partial dissociation of the hydrogen can be achieved, for example, by contacting the gas with a hot surface at a temperature greater than 1300° C., by gas discharge or by ionizing radiation.

Hydrogen is normally present in the gas mixture in molecular form, $H_2$, but when diffusing in solid material, especially metal, it is in atomic form and thus the transfer of hydrogen into the material of the membrane is greatly impeded in the case of metals which dissolve hydrogen endothermically. As disclosed in U.S. Pat. No. 3,407,571, for example, membranes of materials which dissolve hydrogen endothermically are, for this reason, provided on the upstream or primary side with a metal which catalyzes the dissociation hydrogen, palladium and palladium alloys being especially chosen for the purpose. The improvement achieved in this way, however, cannot compare with that of German Patent Application No. 2854638 referred to above. The process of the latter is distinguished not only by high rates of hydrogen separation, but also by the possibility of maintaining very low pressures on the primary side of the membrane. Furthermore, the process can achieve considerable compression of the separated hydrogen on the secondary side of the membrane, since the hydrogen released from the membrane on the secondary side is in molecular form and therefore prevented from returning to the primary side through the membrane.

While the process mentioned above is effective, it is desirable to enhance its effectiveness still further. According to the present invention this is achieved by using a membrane comprising at least two layers with the material of the layer on the primary or upstream side being less dissolving to hydrogen and having a lower release rate constant at the operating temperature than the material of the layer on the secondary or downstream side.

Thus, according to one aspect of the present invention there is provided a method of separating hydrogen from a gas mixture by diffusion, which method comprises: providing a diffusion cell including first and second chambers separated by a non-porous membrane which is selectively permeable to hydrogen, the membrane comprising at least two layers consisting respectively of a first material on one side of the membrane adjacent to the first chamber and a second material on the other side of the membrane adjacent to the second chamber, the first material being less dissolving to hydrogen and having a lower release rate constant at the operating temperature than the second material, admitting the gas mixture to the first chamber, at least partially dissociating the hydrogen of the mixture in said first chamber, contacting the mixture with said one side of the membrane whereby hydrogen diffuses through the membrane, and collecting the diffused hydrogen in said second chamber.

According to another aspect of the invention, an apparatus for separating hydrogen from a gas mixture by diffusion, comprises a diffusion cell including first and second chambers separated by a non-porous membrane which is selectively permeable to hydrogen, and means for dissociating hydrogen in the first chamber, wherein the membrane comprises at least two layers consisting respectively of a first material on one side of the membrane adjacent to the first chamber and a second material on the other side of the membrane adjacent to the second chamber, the first material being less dissolving to hydrogen and having a lower release rate constant at the operating temperature than the second material.

The diffusion cell may provide a sequence of chambers including one or more intermediate chambers, the chambers being separated by non-porous membranes constructed as described above and including a hydrogen dissociating device next to the primary side of each membrane.

Diffusion studies on iron membranes have, surprisingly, revealed that the effectiveness of hydrogen separation can be increased by providing a copper coating on the primary or upstream side. Copper dissolves hydrogen to a lesser extent than iron and has, moreover, a lower release rate constant. If, therefore, hydrogen atoms are "pushed into" the copper with the aid of a dissociation device such as a radio frequency or a glow discharge or other device operated on the primary side, a directional flow towards the secondary side will result due to the higher solubility of hydrogen in the iron. The hydrogen atoms present in the copper layer, which are in considerable concentration due to the dissociation-enhanced diffusion, are practically "extracted" by the iron which, especially at elevated temperatures, releases the hydrogen again easily from the metallic lattice of the iron into the gas volume.

The dissociation of hydrogen can be realized as mentioned above by contacting a hot surface of a temperature of above 1300° C., by gas discharge as e.g. glow discharge or high frequency discharge or by ionizing radiation. The selection of the most suitable dissociating device is influenced by the hydrogen concentration in the upstream gas to be separated and the gas pressure. Thus a most effective dissociating device is provided in the case of very low hydrogen concentrations.

The dissociation-enhanced permeation through a membrane having at least two layers, in accordance with the invention, is effectively determined by the quotients of: (a) the hydrogen solubilities, and (b) the release rate constants of the materials of the two layers, which are temperature-dependent. In the case of a copper-iron two-layer membrane, the quotient (a) of the hydrogen solubilities increases with decreasing temperature. In addition to this, the mobility of the hydrogen atoms is improved as the temperature increases and release of hydrogen from the surface of the iron is promoted at a higher temperature, so that, because of the opposing effects, an optimal range can be determined. More favourable separation results have been obtained experimentally at an operating temperature of 300° C. than at 150° C., whereas the compression achieved was higher at the lower temperature.

According to the present invention, the membrane may comprise more than two layers as long as the above condition is fulfilled, namely that the material of the layer on the primary or upstream side is less soluble in hydrogen and has a lower release rate constant than the material of the layer on the downstream or secondary side; it is therefore possible, for example by providing intermediate layers, to enhance the mechanical stability of the membrane.

The material of the layer on the primary side may be, instead of copper aluminium, gold, platinum or silver, while nickel or steel may be provided instead of iron on the secondary side of the membrane. The materials of the layers need not be different elemental metals, but may be of different alloys. Intermediate layers, if any, should be of materials permeable to and dissolving endothermically hydrogen, the solubility of hydrogen in these materials being conveniently in between the solubilities in the primary and the secondary layer materials. The overall thickness of the membrane should be in the normal range used for diffusion separation, the objective being to keep the thickness of the membrane as small as possible consistent with mechanical stability.

Since the primary layer serves essentially as a barrier, this layer should ideally be very thin but just of sufficient thickness to cover completely the primary side of the membrane. It is therefore advisable to use membranes whose primary layer has a thickness of the order of fractions up to a few micrometers.

The use of a multi-layer membrane according to the invention with hydrogen solubility and release gradients towards the primary side is suitable not only for the separation of hydrogen from gas mixtures involving dissociation on the primary side, but may also be appropriate for electrolytic hydrogen separation and diffusion, the membrane being used as the cathode. The dissociation-enhanced permeation intensified by the solubility and release gradients of the membrane responds in a quick and sensitive manner, particularly if the membrane is sufficiently thin, and can therefore be used as a sensitive hydrogen probe. For this purpose, a membrane in the form of a dummy tube with an external primary side to which a dissociation device is connected, whereas the interior of the tube is connected with a hydrogen indicator, if suitable.

Furthermore, as a particular advantage of a membrane according to the invention, it should be noted that the choice of the layer materials is independent of the nature of the surface, especially contamination. However, the interface between the materials should be as clean as possible and free from impurities so as to avoid an accumulation of hydrogen and obstruction of transitions at the interface. The operating pressure on the primary side of the membrane usually amounts to no more than a few millibars.

Particularly favourable results are obtained at low pressures, of the order of $10^{-3}$ millibars by the the method of the present invention, the working range being determined by the permeation coefficient $W$, according to the equation $$W = \frac{2\sigma k_r}{D} \cdot x_0 \cdot c_{eq}$$

in which $D$ is the diffusion constant, $2\sigma k_r$ is the release rate constant, $x_0$ is the membrane thickness and $c_{eq}$ is the equilibrium concentration of the hydrogen in the metal of the membrane. Although it is also possible to work in the range of permeation coefficients greater than 1, the results are more favourable if the permeation coefficient is less than or equal to 1. For an approximate evaluation, data of the secondary side only need be inserted in the above formula.

The dissociation of the hydrogen molecules in the gas mixture can be achieved by a radio frequency or a glow discharge process in which the diffusion membrane itself can be cathode. Discharge power levels of the order of 10 to 100mW/cm$^2$ membrane area are adequate for a useful mode of operation.

A test system using a copper-iron membrane as described above has revealed that the retransport of hydrogen from the secondary chamber to the primary chamber is less than the transport through the membrane in the direction from copper to iron by a factor of about 2, if means for dissociating the hydrogen are also provided in the secondary chamber. It is therefore possible to use a series of intermediate membranes of the type mentioned above, with intermediate chambers in each of which means are provided for the dissociation of hydrogen, for separating hydrogen isotopes. Thus, for example, in the case of an initial mixture of tritium and protium, the latter being more mobile, light hydrogen is enriched towards the secondary chamber, the purity of the separated protium being improved by recycling. Within a system of this kind having a series of chambers, the consecutive membranes may each be of the same construction, or they may consist of different materials.

Figure 2:
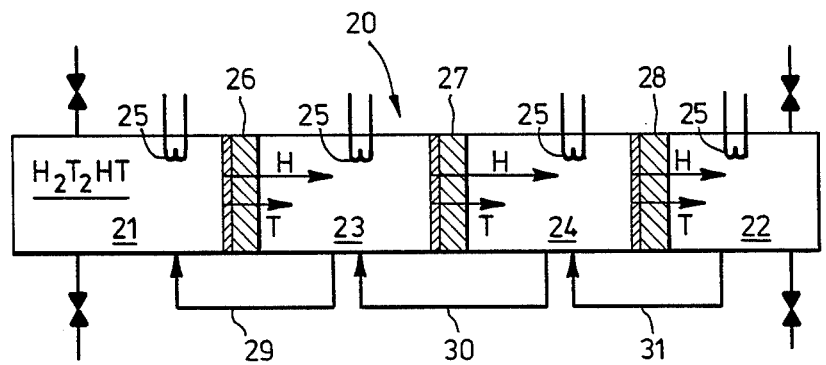

Two embodiments of the present invention are illustrated by way of example in the accompanying schematic drawings, in which:

FIG. 1 illustrates a first apparatus for implementing the method of the invention; and FIG. 2 illustrates a second apparatus for implementing the method of the invention.

Referring to FIG. 1, a diffusion cell 10 includes a first chamber 1, referred to herein as the primary chamber, and a second chamber 2, referred to herein as the secondary chamber. The chambers 1 and 2 are separated by a non-porous membrane 3 which is selectively permeable to hydrogen. A radio frequency device used for the dissociation of hydrogen in the primary chamber 1 is illustrated schematically at 4. Valve controlled inlets 11 to the primary chamber 1 are provided for admitting a gas mixture to the primary chamber. Valve controlled outlets 12 connected to the secondary chamber 2 are provided for withdrawing hydrogen collected by the secondary chamber. The figure is schematic, of course; both chambers and the dissociating device may be arranged concentrically or in another suitable manner.

The non-porous membrane 3 comprises at least two layers 13, 14 although, as previously mentioned, the membrane may alternatively consist of more than two layers. The layer 14 on the downstream side of the membrane adjacent to the chamber 2 is of iron, and the layer 13 on the upstream side of the membrane adjacent to the chamber 1 consists of a thin copper coating on the iron layer. As previously mentioned, other materials may be used, but an essential condition is that the material of the first layer 13 be less soluble in hydrogen and have a lower release rate constant at the operating temperature of the apparatus than the material of the second layer 14. A suitable operating temperature is 300° C.

In use of the apparatus, a gas mixture from which hydrogen is to be separated is admitted via the inlets 11 into the chamber 1. The hydrogen of the mixture is at least partially dissociated by the dissociating means 4. The admitted gases thus containing atomic hydrogen are contacted with the upstream side of the membrane 3 represented by the layer 13, the hydrogen content of the mixture preferentially permeating through the membrane into the secondary chamber 2.

The apparatus illustrated in FIG. 2 is intended for the separation of the isotopes in a mixture of hydrogen isotopes. The apparatus comprises a diffusion cell 20 including a primary chamber 21 to which the mixture of hydrogen isotopes can be admitted via inlet valves, and a secondary chamber 22 which collects the diffused hydrogen isotope. Between the chambers 21 and 22 are two intermediate chambers 23, 24, although it is to be understood that the number of intermediate chambers may be more or less than two. Each of the chambers houses a respective radio frequency device 25 for effecting at least partial dissociation of the hydrogen in the chamber. The chambers are separated by non-porous, multilayer membranes 26, 27, 28, which are selectively permeable to hydrogen and which are constructed as described above with reference to FIG. 1.

A part of the separated hydrogen in each chamber 23, 24 and 22 is refluxed to the preceding chamber via a feed loop 29, 30 or 31 whereby to increase the overall yield of the separation process. The gas mixture introduced to the chamber 21 consists, for example, of $H_2$, $T_2$ and HT molecules, at least some of the molecules being dissociated by the device 25 before being contacted with the membrane 26. The dissociated hydrogen atoms permeate through the membrane 26 into the chamber 23, the lighter H atoms being preferentially diffused. The selective permeation process takes place at each membrane, the H atoms being transmitted to the succeeding chamber preferentially at each stage, such that the concentration of the lighter isotope become progressively enriched towards the secondary chamber 22.

What we claim is:

1. A method of separating hydrogen from a gas mixture by diffusion, which method comprises:
   providing a diffusion cell including first and second chambers separated by a non-porous membrane which is selectively permeable to hydrogen, the membrane comprising at least two layers consisting respectively of a first material on one side of the membrane adjacent to the first chamber and a second material on the other side of the membrane adjacent to the second chamber, the first material being less dissolving to hydrogen and having a lower release rate constant at the operating temperature than the second material,
   admitting the gas mixture to the first chamber,
   at least partially dissociating the hydrogen of the mixture in said first chamber,
   contacting the mixture with said one side of the membrane whereby hydrogen diffuses through the membrane, and
   collecting the diffused hydrogen in said second chamber.

2. A method according to claim 1, wherein said first and second materials are copper and iron, respectively, the layer of said first material being constituted by a thin copper coating on the iron layer.

3. A method of separating hydrogen from a gas mixture by diffusion, which method comprises:
   providing a diffusion cell including first and second chambers separated by a non-porous membrane which is selectively permeable to hydrogen, the membrane comprising at least two layers consisting respectively of a first material on one side of the membrane adjacent to the first chamber and a second material on the other side of the membrane adjacent to the second chamber, said materials being materials which dissolve hydrogen endothermically, and the first material being less dissolving to hydrogen and having a lower release rate constant at the operating temperature than the second material,
   admitting the gas mixture to the first chamber,
   at least partially dissociating the hydrogen of the mixture in said first chamber,
   contacting the mixture with said one side of the membrane whereby hydrogen diffuses through the membrane, and
   collecting the diffused hydrogen in said second chamber.

4. A method in accordance with claim 3, wherein the gas mixture is a mixture of hydrogen isotopes, the lighter isotopes being separated selectively by diffusion through the membrane whereby to effect enrichment of the lighter isotopes progressively.

5. A method according to claim 4, wherein the lighter isotope enrichment is effected in successive stages by diffusing the hydrogen through a sequence of said membranes, the membranes defining at least one intermediate chamber wherein dissociation of the hydrogen collected thereby is effected.

6. An apparatus for separating hydrogen from a gas mixture by diffusion, comprising
   a diffusion cell including first and second chambers separated by a non-porous membrane which is selectively permeable to hydrogen, and means for dissociating hydrogen in the first chamber, wherein the membrane comprises at least two layers consisting respectively of a first material on one side of the membrane adjacent to the first chamber and a second material on the other side of the membrane adjacent to the second chamber, the first material being less dissolving to hydrogen and having a lower release rate constant at the operating temperature than the second material.

7. An apparatus for separating hydrogen from a gas mixture by diffusion, comprising
   a diffusion cell providing a sequence of chambers including a first chamber to which the gas mixture is admitted, a second chamber in which the separated hydrogen is collected, and at least one intermediate chamber, each pair of adjacent chambers being separated by a non-porous membrane which is selectively permeable to hydrogen, and
   means for dissociating hydrogen in the first chamber and in the or each intermediate chamber,
   wherein each said membrane comprises at least two layers consisting respectively of a first material on the upstream side of the membrane and a second material on the downstream side of the membrane, the first material being less dissolving to hydrogen and having a lower release rate constant at the operating temperature than the second material.

8. In an apparatus for separating hydrogen from a mixture of gases by diffusion through a non-porous membrane which is selectively permeable to hydrogen, the hydrogen of the mixture being at least partially dissociated prior to being contacted with the membrane, the improvement in which the membrane comprises at least two layers consisting respectively of a first material on the upstream side of the membrane and a second material on the downstream side of the membrane, the first material being less dissolving to hydrogen and having a lower release rate constant at 300° C. than the second material.

9. An apparatus according to claim 8, wherein said first and second materials are copper and iron, respectively.

* * * * *